(12) United States Patent
Gustavsson et al.

(10) Patent No.: US 9,736,385 B2
(45) Date of Patent: Aug. 15, 2017

(54) PERSPECTIVE CHANGE USING DEPTH INFORMATION

(71) Applicant: Sony Corporation, Tokyo (JP)

(72) Inventors: Jonas Gustavsson, Lund (SE); Daniel Linåker, Lund (SE); Johannes Elg, Lund (SE); Fredrik Mattisson, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 367 days.

(21) Appl. No.: 14/362,976

(22) PCT Filed: Jan. 8, 2014

(86) PCT No.: PCT/IB2014/000012
§ 371 (c)(1),
(2) Date: Jun. 5, 2014

(87) PCT Pub. No.: WO2015/104569
PCT Pub. Date: Jul. 16, 2015

(65) Prior Publication Data
US 2016/0227125 A1 Aug. 4, 2016

(51) Int. Cl.
*H04N 5/262* (2006.01)
*H04N 5/232* (2006.01)
(Continued)

(52) U.S. Cl.
CPC .......... *H04N 5/23296* (2013.01); *G06T 7/50* (2017.01); *G06T 7/70* (2017.01); *H04N 5/222* (2013.01);
(Continued)

(58) Field of Classification Search
CPC .. B62B 5/02; B65G 7/04; E04H 6/186; E04H 6/24; E04H 6/422; G06T 2207/10016;
(Continued)

(56) References Cited

U.S. PATENT DOCUMENTS 9,025,051 B2 * 5/2015 Pylvanainen ...... H04N 5/23296
348/169
2011/0267503 A1 * 11/2011 Kunishige ............ H04N 5/232
348/240.1
(Continued)

OTHER PUBLICATIONS

Anonymous: "The Dolly-Zoom effect", Feb. 9, 2013, XP055115500, Retrieved from the Internet: URL: http://blitzbasic.com/Community/posts.php?topic=99719 [retrieved on Apr. 28, 2014].
(Continued)

*Primary Examiner* — Trung Diep
(74) *Attorney, Agent, or Firm* — James C. Edwards; Moore & Van Allen, PLLC

(57) ABSTRACT

The invention is directed to determining compensation distance for capturing an image in a zoom mode using a camera. An exemplary method comprises determining the camera is in a non-zoom mode; receiving first depth information associated with an object in the image when the camera is in the non-zoom mode; receiving first angle information associated with the object in the image when the camera is in the non-zoom mode; switching from the non-zoom mode to a zoom mode; receiving second angle information associated with the object in the image when the camera is in the zoom mode; determining a compensation distance for capturing the image of the object in the zoom mode based on the first depth information, the first angle information, and the second angle information; and generate an image based on the compensated distance.

10 Claims, 3 Drawing Sheets

(51) Int. Cl.
*H04N 5/222* (2006.01)
*G06T 7/70* (2017.01)
*G06T 7/50* (2017.01)

(52) U.S. Cl.
CPC ....... *H04N 5/23245* (2013.01); *H04N 5/2621* (2013.01); *G06T 2207/30244* (2013.01)

(58) Field of Classification Search
CPC . G06T 2207/10024; G06T 2207/10052; G06T 7/0018; H04N 17/002
See application file for complete search history.

(56) References Cited

U.S. PATENT DOCUMENTS

2012/0218633 A1* 8/2012 Cincotti ................... F41J 1/01
359/463
2013/0011045 A1* 1/2013 Lee ................... H04N 13/0022
382/154

OTHER PUBLICATIONS

International Search Report and Written Opinion; May 14, 2014; issued in International Patent Application No. PCT/IB2014/000012.
International Preliminary Report on Patentability; Jul. 21, 2016; issued in International Patent Application No. PCT/IB2014/000012.

\* cited by examiner

Fig. 2
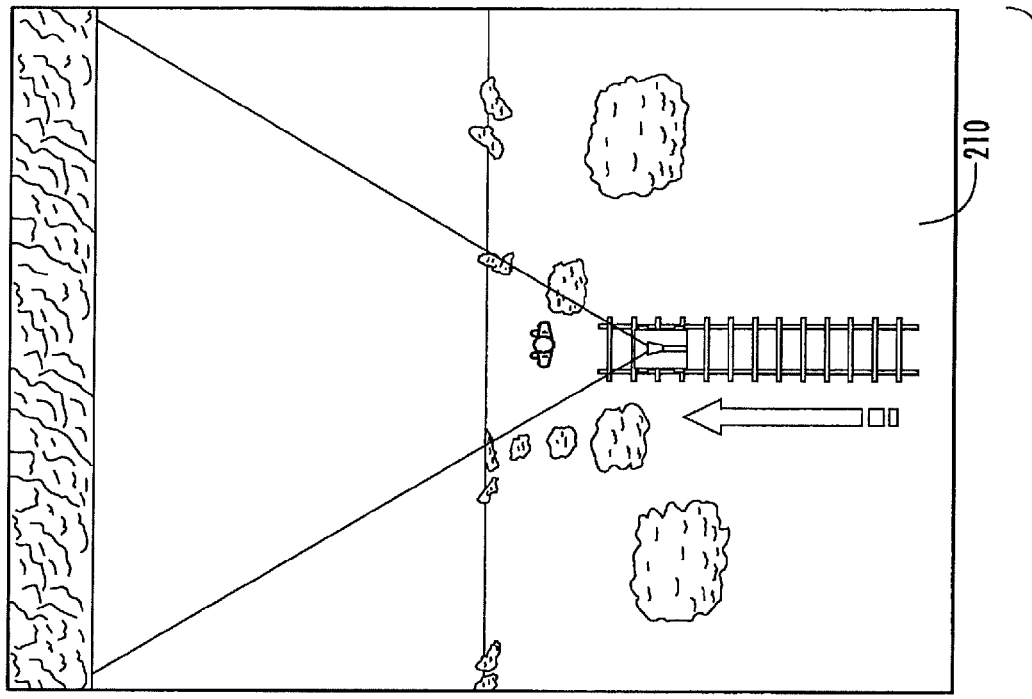
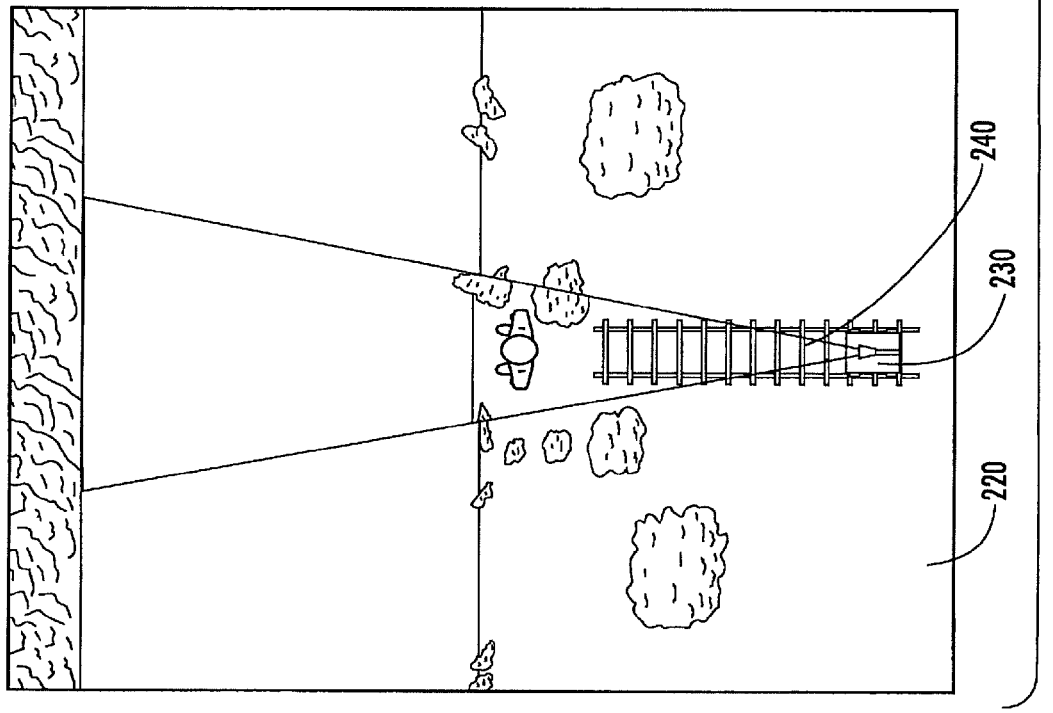
FIG. 2

PERSPECTIVE CHANGE USING DEPTH INFORMATION

BACKGROUND ART

A dolly effect refers to a situation where objects located at a similar distance from the camera do not move, and objects in front of or behind those objects zoom in and out. The dolly effect is produced by zooming into or out of the image while the camera is moved back and forth on a dolly. The present invention is directed to producing a dolly effect without moving the camera on a dolly.

SUMMARY

Embodiments of the invention are directed to a system, method, and computer program product for determining a compensation distance for capturing an image in a zoom mode using a camera. An exemplary method comprises: determining the camera is in a non-zoom mode; receiving first depth information associated with an object in the image when the camera is in the non-zoom mode; receiving first angle information associated with the object in the image when the camera is in the non-zoom mode; switching from the non-zoom mode to a zoom mode; receiving second angle information associated with the object in the image when the camera is in the zoom mode; determining a compensation distance for capturing the image of the object in the zoom mode based on the first depth information, the first angle information, and the second angle information; and generating an image based on the compensated distance.

In some embodiments, the camera is not moved physically when switching from the non-zoom mode to the zoom mode.

In some embodiments, the camera comprises a still camera or a video camera.

In some embodiments, the image is associated with a preview stream.

In some embodiments, the camera comprises an array camera.

In some embodiments, the camera is part of at least one of a mobile phone, a tablet computing device, a notebook computing device, a watch, or a wearable or portable device.

In some embodiments, the first depth information comprises a first distance from the camera to the object.

In some embodiments, the zoom mode comprises a zoom-in mode.

In some embodiments, in the zoom-in mode, the method further comprises: receiving information associated with at least one pixel located behind the object.

In some embodiments, the zoom mode comprises a zoom-out mode.

In some embodiments, in the zoom-out mode, the method further comprises: receiving information associated with at least one pixel located outside a border of a frame associated with the image.

In some embodiments, in the zoom-out mode, the method further comprises: cropping an image sensor associated with the camera.

In some embodiments, the camera does not comprise a zoom lens.

In some embodiments, the camera comprises a stereo camera, a lightfield camera, or a time-of-flight camera.

In some embodiments, a system is provided for determining a compensation distance for capturing an image in a zoom mode using a camera. The system comprises: a memory; a processor; a module stored in the memory, executable by the processor, and configured to: determine the camera is in a non-zoom mode; receive first depth information associated with an object in the image when the camera is in the non-zoom mode; receive first angle information associated with the object in the image when the camera is in the non-zoom mode; switch from the non-zoom mode to a zoom mode; receive second angle information associated with the object in the image when the camera is in the zoom mode; determine a compensation distance for capturing the image of the object in the zoom mode based on the first depth information, the first angle information, and the second angle information; and generate an image based on the compensated distance.

In some embodiments, a computer program product is provided for determining a compensation distance for capturing an image in a zoom mode using a camera. The computer program product comprises a non-transitory computer-readable medium comprising code configured to: determine the camera is in a non-zoom mode; receive first depth information associated with an object in the image when the camera is in the non-zoom mode; receive first angle information associated with the object in the image when the camera is in the non-zoom mode; switch from the non-zoom mode to a zoom mode; receive second angle information associated with the object in the image when the camera is in the zoom mode; determine a compensation distance for capturing the image of the object in the zoom mode based on the first depth information, the first angle information, and the second angle information; and generate an image based on the compensated distance.

BRIEF DESCRIPTION OF DRAWINGS

Figure 1:
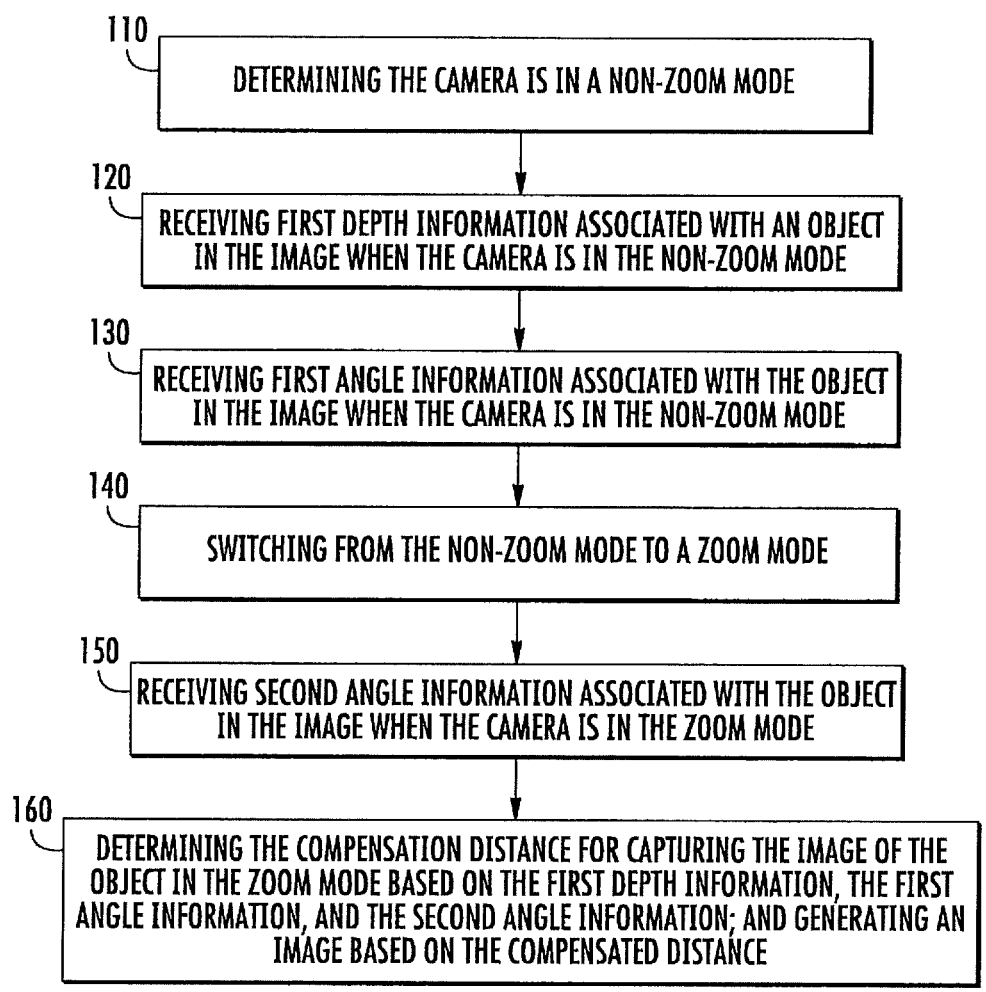

Having thus described embodiments of the invention in general terms, reference will now be made to the accompanying drawings, where:

FIG. 1 present an exemplary switching operation process flow, in accordance with embodiments of the present invention;

FIG. 2 presents a switching operation from a non-zoom mode to a zoom mode; and

Figure 3:
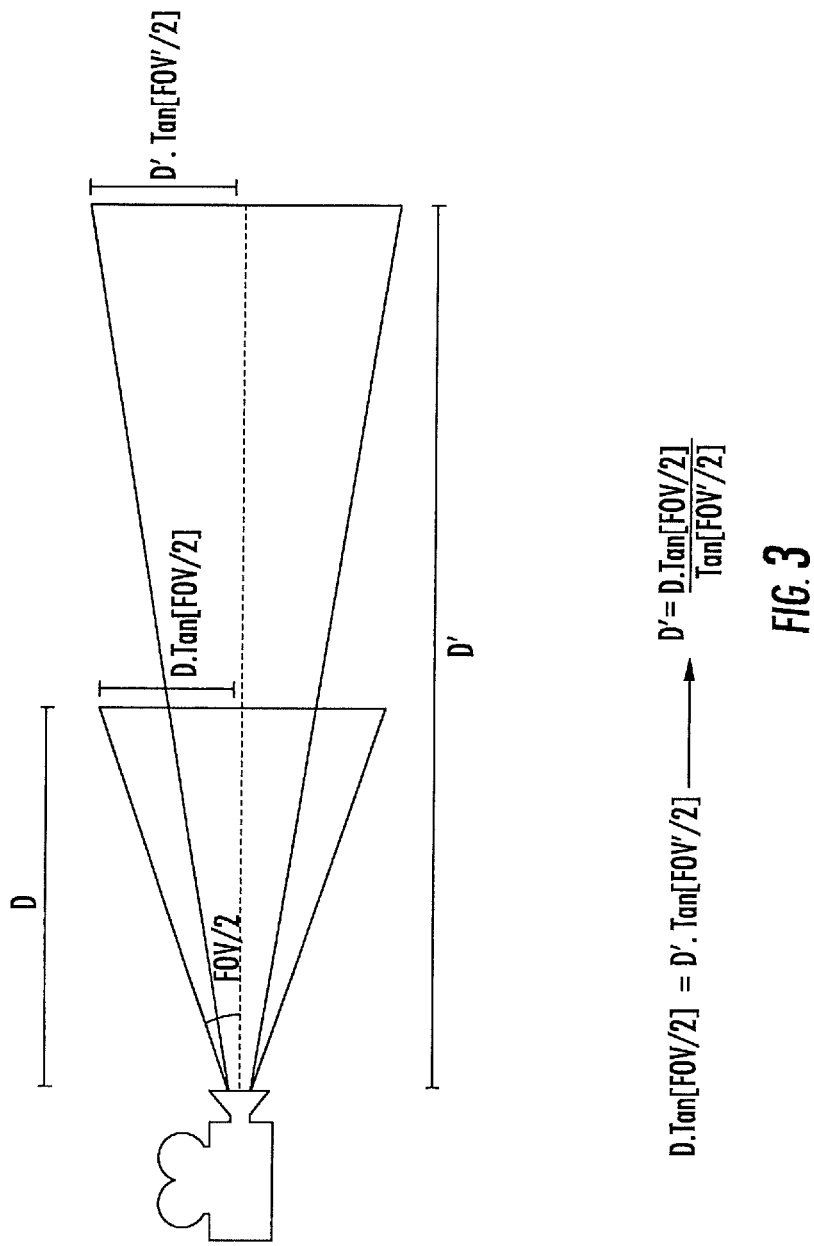

FIG. 3 presents a switching operation from a non-zoom mode to a zoom mode, in accordance with embodiments of the present invention.

DESCRIPTION OF EMBODIMENTS

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

The present invention is directed to using depth information to change perspective in an image. As used herein, an image includes a still image or a video (stream of images) that has been captured or has yet to be captured (e.g., a preview image or stream). The image may be captured by an electronic device (e.g., a camera (e.g., a still camera, a video camera, an array camera, etc.), a mobile phone, a tablet or notebook computing device, a watch, a wristband, any other wearable or portable device, etc.). In some embodiments, the image is associated with a preview stream.

The present invention is directed to changing a camera's mode from a non-zoom mode to a zoom mode. When changing from a non-zoom mode to a zoom 4 mode, there is a change in a perspective of the image. The present invention is directed to determining a compensation distance for the zoom mode based on the depth information associated with one or more objects in the image. As used herein, a nonzoom mode is a mode where an object in an image is not magnified. As used herein, a zoom mode is a mode where an object in an image is magnified.

Therefore, embodiments of the invention are directed to a system, method, and computer program product for determining a compensation distance for capturing an image in a zoom mode using a camera. An exemplary process flow is presented in FIG. 1. As indicated in block 110, the method comprises determining the camera is in a non-zoom mode. In block 120, the method comprises receiving first depth information associated with an object in the image when the camera is in the non-zoom mode. The depth information described herein may comprise a distance from the camera to the object. The object may be a living or non-living object. In block 130, the method comprises receiving first angle information associated with the object in the image when the camera is in the non-zoom mode. The first angle information comprises a first angle associated with capturing the image in the non-zoom mode. In block 140, the method comprises switching from the non-zoom mode to a zoom mode. In block 150, the method comprises receiving second angle information associated with the object in the image when the camera is in the zoom mode. The second angle information comprises a second angle associated with capturing the image in the zoom mode. In block 160, the method comprises determining a compensation distance for capturing the image of the object in the zoom mode based on the first depth information, the first angle information, and the second angle information; and generating an image based on the compensated distance.

The present invention enables a fake dolly effect without using a zoom lens in a camera and without moving the camera on a dolly. As used herein, a dolly comprises equipment to create smooth camera movement. The dolly may mount a camera and may itself be mounted on a track. A dolly effect refers to a situation where objects located at a similar distance from the camera do not move, and objects in front of or behind those objects zoom in and out. The dolly effect is produced by zooming into or out of the image while is camera is moved back and forth on a dolly. The speed of zooming is proportional to the speed of the camera on the dolly. This enables the object 5 in the foreground of the image to be still, while the background changes in size. The dolly effect requires a zoom lens and precision (e.g., equal to or greater than a predetermined precision level) in the movement of the camera on the dolly. The present invention enables a fake dolly effect without using zoom lens in a camera and without moving the camera a dolly. Therefore, in some embodiments, the camera is not moved physically when switching from the non-zoom mode to the zoom mode. Additionally, in some embodiments, the camera does not comprise a zoom lens. The invention described herein can emulate the effects produced by both a dolly moving forward and dolly moving backward based on depth information associated with objects in the image. For example, when the dolly is moving forward, the camera zooms in to an object (increases magnification of the object), thereby producing a dolly effect that keeps the object at a selected distance at the same size in the image.

The present invention enables zooming into an image and zooming out of an image without moving a camera on a dolly. In some embodiments, the zoom mode comprises a zoom-in mode, i.e., the camera is zooming in on or magnifying an object. In some embodiments, in the zoom-in mode, the present invention receives information associated with at least one pixel located behind the object (e.g., the foreground object). As used herein, a pixel refers to a controllable element of an image presented on a display. This received information may be obtained by considering the parallax effect associated with an array camera. As used herein, parallax is the displacement in apparent position of an object viewed along two different lines of sight. If more information is required for the zooming in (or zooming out) operation, the present invention interpolates pixel information for zooming in (or out) of the image.

In some embodiments, the zoom mode comprises a zoom-out mode, i.e., the camera is zooming out from or unmagnifying an object. When zooming out, the present invention receives information associated with at least one pixel located outside a border of a frame associated with the image. The present invention enables receipt of this information in the zoom-out mode by cropping an image sensor associated with a camera, similar to a digital zoom operation.

As used herein, an array camera comprises several low resolution cameras (or sensors) that are arranged in a grid (e.g., a quadrilateral grid). As used herein, a low resolution camera is a camera that captures an image with a resolution less than a 6 predetermined resolution. Each camera in the grid of cameras may substantially simultaneously capture an image from a different angle. In alternate embodiments, each camera may capture an image at a different time. Additionally, each camera captures an image using a single-colored filter (e.g., a red, green, or blue filter). When the images captured by each camera are edited together using functionality to determine depth information (parallax calculations) associated with the images and functionality to increase the resolution of the final image by interpolating the individual red, green, and blue images, a high resolution RGB (red green blue) image is obtained. These functions may be performed either after or substantially simultaneously with capturing an image using the array camera. These functions may be performed by the array camera or other computing devices in communication with the array camera.

In some embodiments, the camera may be a stereo camera. A stereoscopic camera has more than one lens (e.g., two lenses) and more than one image sensor (e.g., two image sensors). Each image sensor is associated with a separate lens. Using multiple image sensor-lens pairs, a stereoscopic camera simulates human binocular vision and enables capture of three-dimensional images. The stereoscopic camera enables calculation of depth information associated with pixels in the image (i.e., distance of one or more objects in the image frame). In still other embodiments, the camera may be a time-of-flight camera that determines depth information associated with one or more objects in the image frame, and consequently the compensation distance, based on measuring the time of flight of a light signal between the camera and one or more objects in the image.

In still other embodiments, the camera may be a lightfield or plenoptic camera. A lightfield camera may use a microlens array to capture lightfield information for a scene to be captured by the lightfield camera. As used herein, a microlens array includes one or more microlenses that are formed in a one-dimensional or two-dimensional array on a substrate. As used herein, lightfield information includes information regarding the light present in the scene to be captured. This information includes an amount of light associated with a point in the scene to be captured, direction and/or intensity of light rays associated with a point in the scene to be captured, etc. In embodiments of the invention, this information may be used to determine depth 7 information associated with one or more objects in the image frame, and consequently the compensation distance, based on the lightfield information described herein.

Referring now to FIG. 2, FIG. 2 indicates a camera capturing an image in a non-zoom mode 210. FIG. 2 also indicates a camera 230 capturing an image in a zoom mode 220. As indicated in FIG. 2, the camera is placed on a dolly that moves backwards on a track 240 in order to capture the image in a zoom mode 220, and consequently produce a dolly effect. The object is magnified in the zoom mode 220. As indicated in FIG. 2, the camera 230 captures a wider area of an image scene in the non-zoom mode 210 when compared the zoom mode 220.

Referring now to FIG. 3, FIG. 3 indicates a camera capturing an image in a non-zoom mode and an image in a zoom mode. As indicated in FIG. 3, the camera does not move (e.g., on a dolly) when moving from non-zoom mode to a zoom mode. Instead, the present invention enables capturing of the image in the zoom mode using a compensation distance. In a non-zoom mode, an object is located at a distance D from the camera (e.g., an image sensor of the camera). The angle associated with capturing the image in a non-zoom mode is FOV/2. In a zoom mode, the object is located at a distance D' from the camera. The distance D'−D (D subtracted from D') is referred as the compensation distance (or compensated distance). The angle associated with capturing the image in a zoom mode is FOV'/2. The present invention enables determination of the distance D' from the camera. D' is determined based on the following equation: D×tan (FOV/2)=D'×tan (FOV'/2). Therefore, D' is determined based on multiplying D and tan (FOV/2), and dividing the result by tan (FOV'/2).

Other than a method or process flow as indicated in FIG. 1, the present invention also provides a system and computer program product. In some embodiments, a system is provided for determining a compensation distance for capturing an image in a zoom mode using a camera. The system comprises: a memory; a processor; a module stored in the memory, executable by the processor, and configured to: determine the camera is in a non-zoom mode; receive first depth information associated with an object in the image when the camera is in the non-zoom mode; receive first angle information associated with the object in the image when the camera is in the non-zoom mode; switch from the non-zoom mode to a zoom mode; receive second angle information associated with the object in the image when the camera is in the zoom mode; and 8 determine a compensation distance for capturing the image of the object in the zoom mode based on the first depth information, the first angle information, and the second angle information.

In some embodiments, a computer program product is provided for determining a compensation distance for capturing an image in a zoom mode using a camera. The computer program product comprises a non-transitory computer-readable medium comprising code configured to: determine the camera is in a non-zoom mode; receive first depth information associated with an object in the image when the camera is in the non-zoom mode; receive first angle information associated with the object in the image when the camera is in the non-zoom mode; switch from the non-zoom mode to a zoom mode; receive second angle information associated with the object in the image when the camera is in the zoom mode; and determine a compensation distance for capturing the image of the object in the zoom mode based on the first depth information, the first angle information, and the second angle information.

The invention is not limited to any particular types of devices comprising a camera. As used herein, a device may also be referred to as a system. Examples of devices include cameras or other image-capturing devices, mobile phones or other mobile computing devices, televisions, laptop computers, smart screens, tablet computers or tablets, desktop computers, e-readers, scanners, portable media devices, gaming devices, or other portable or non-portable computing or non-computing devices. The device comprises a processor, a memory, a camera, and a module stored in the memory, executable by the processor, and configured to perform the various processes described herein. The processor described herein generally includes circuitry for implementing audio, visual, image-capturing, and/or logic functions. For example, the processor may include a digital signal processor device, a microprocessor device, and various analog-to-digital converters, digital-to-analog converters, and other support circuits. The processor may also include functionality to operate one or more software programs based at least partially on computer-executable program code portions thereof, which may be stored, for example, in a memory.

In accordance with embodiments of the invention, the term "module" with respect to a system (or a device) may refer to a hardware component of the system, a software component of the system, or a component of the system that includes both 9 hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CDROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular 11 machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

The invention claimed is:

1. A method for determining a compensation distance for capturing an image in a zoom mode using a camera, the method comprising:
   determining the camera is in a non-zoom mode;
   receiving first depth information associated with an object in the image when the camera is in the non-zoom mode, wherein the first depth information is defined as a first distance from the camera to the object;
   receiving first angle information associated with the object in the image when the camera is in the non-zoom mode, wherein the first angle information is defined as a first field of view angle provided for in the non-zoom mode;
   switching from the non-zoom mode to a zoom mode, wherein the zoom mode comprises a zoom-in mode and zoom-out mode;
   receiving second angle information associated with the object in the image when the camera is in the zoom mode, wherein the second angle information is defined as a second field of view angle provided for in the zoom mode, wherein in the zoom-in mode the second angle information is associated with at least one pixel located outside a border of a frame associated with the image and in the zoom-out mode that second angle information is associated with at least one pixel located behind the object in the image;
   determining the compensation distance for capturing the image of the object in the zoom mode based on the first depth information, the first angle information, and the second angle information, wherein the compensation distance is defined as a difference in distance between the object in the non-zoom mode and the object in the zoom mode; and generating an image based on the compensated distance.

2. The method of claim 1, wherein the camera is not moved physically when switching from the non-zoom mode to the zoom mode.

3. The method of claim 1, wherein the camera comprises a still camera or a video camera.

4. The method of claim 1, wherein the image is associated with a preview stream.

5. The method of claim 1, wherein the camera is part of at least one of a mobile phone, a tablet computing device, a notebook computing device, a watch, or a wearable or portable device.

6. The method of claim 1, wherein in the zoom-out mode, the method further comprises cropping an image sensor associated with the camera.

7. The method of claim 1, wherein the camera does not comprise a zoom lens.

8. The method of claim 1, wherein the camera comprises an array camera, a time-of-flight camera, a stereo camera, or a lightfield camera.

9. A system for determining a compensation distance for capturing an image in a zoom mode using a camera, the system comprising:

a memory;

a processor;

a module stored in the memory, executable by the processor, and configured to:

determine the camera is in a non-zoom mode;

receive first depth information associated with an object in the image when the camera is in the non-zoom mode, wherein the first depth information is defined as a first distance from the camera to the object;

receive first angle information associated with the object in the image when the camera is in the non-zoom mode, wherein the first angle information is defined as a first field of view angle provided for in the non-zoom mode;

switch from the non-zoom mode to a zoom mode, wherein the zoom mode comprises a zoom-in mode and zoom-out mode;

receive second angle information associated with the object in the image when the camera is in the zoom mode, wherein the second angle information is defined as a second field of view angle provided for in the zoom mode, wherein in the zoom-in mode the second angle information is associated with at least one pixel located outside a border of a frame associated with the image and in the zoom-out mode that second angle information is associated with at least one pixel located behind the object in the image;

determine the compensation distance for capturing the image of the object in the zoom mode based on the first depth information, the first angle information, and the second angle information, wherein the compensation distance is defined as a difference in distance between the object in the non-zoom mode and the object in the zoom mode; and generate an image based on the compensated distance.

10. A computer program product for determining a compensation distance for capturing an image in a zoom mode using a camera, the computer program product comprising a non-transitory computer-readable medium comprising code configured to:

determine the camera is in a non-zoom mode;

receive first depth information associated with an object in the image when the camera is in the non-zoom mode, wherein the first depth information is defined as a first distance from the camera to the object;

receive first angle information associated with the object in the image when the camera is in the non-zoom mode, wherein the first angle information is defined as a first field of view angle provided for in the non-zoom mode;

switch from the non-zoom mode to a zoom mode, wherein the zoom mode comprises a zoom-in mode and zoom-out mode;

receive second angle information associated with the object in the image when the camera is in the zoom mode, wherein the second angle information is defined as a second field of view angle provided for in the zoom mode, wherein in the zoom-in mode the second angle information is associated with at least one pixel located outside a border of a frame associated with the image and in the zoom-out mode that second angle information is associated with at least one pixel located behind the object in the image;

determine the compensation distance for capturing the image of the object in the zoom mode based on the first depth information, the first angle information, and the second angle information, wherein the compensation distance is defined as a difference in distance between the object in the non-zoom mode and the object in the zoom mode; and generate an image based on the compensated distance.

\* \* \* \* \*